(12) United States Patent
Nakamura et al.

(10) Patent No.: US 8,292,358 B2
(45) Date of Patent: Oct. 23, 2012

(54) SUNSHADE DEVICE FOR VEHICLE

(75) Inventors: Yoshitaka Nakamura, Kariya (JP); Takashi Kitani, Nagoya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 12/998,092

(22) PCT Filed: Nov. 30, 2009

(86) PCT No.: PCT/JP2009/070095
§ 371 (c)(1),
(2), (4) Date: Mar. 17, 2011

(87) PCT Pub. No.: WO2010/064595
PCT Pub. Date: Jun. 10, 2010

(65) Prior Publication Data
US 2011/0221237 A1 Sep. 15, 2011

(30) Foreign Application Priority Data
Dec. 5, 2008 (JP) .................. 2008-310563

(51) Int. Cl.
*B60J 10/10* (2006.01)
*B60J 3/02* (2006.01)
(52) U.S. Cl. .................. 296/214; 160/181; 160/222
(58) Field of Classification Search .................. 296/214; 160/130, 181, 218, 222–224, 229.1
See application file for complete search history.

(56) References Cited

U.S. PATENT DOCUMENTS

| 6,196,626 | B1 * | 3/2001 | Ito .................. 296/214 |
| 7,229,125 | B2 * | 6/2007 | Mori et al. .................. 296/214 |
| 7,393,048 | B2 * | 7/2008 | Mori .................. 296/214 |
| 7,571,958 | B2 * | 8/2009 | Mori et al. .................. 296/214 |
| 2008/0001439 | A1 | 1/2008 | Mori et al. | |

FOREIGN PATENT DOCUMENTS

| DE | 10029718 A1 | 12/2001 |
| DE | 102007027233 A1 | 12/2007 |
| EP | 1 977 921 | 12/2009 |
| FR | 2 841 186 | 6/2002 |
| JP | 11-348566 | 12/1999 |
| JP | 2007-230473 | 9/2007 |
| JP | 2007-331527 | 12/2007 |
| JP | 2008-213762 | 9/2008 |

* cited by examiner

*Primary Examiner* — Dennis Pedder
(74) *Attorney, Agent, or Firm* — Finnegan, Henderson, Farabow, Garrett & Dunner, LLP (57) ABSTRACT

A vehicle sunshade device is provided with guide rails arranged on both sides of an opening section provided on a vehicle roof and having guide grooves extending in a front-rear direction, a plurality of sunshade panels having sliders slidable along the guide grooves, and guide mechanisms for guiding the sliders of at least a rearmost sunshade panel of the sunshade panels upward or downward from the guide grooves in a transition from a spread-out state to a stored state. An elastic member is further provided on the vehicle roof and presses the rearmost sunshade panel on a front side sunshade panel, which is ahead of the rearmost sunshade panel, when the sliders of the rearmost sunshade panel enter the guide mechanisms.

5 Claims, 8 Drawing Sheets

SUNSHADE DEVICE FOR VEHICLE

TECHNICAL FIELD

The present invention relates to a sunshade device for a vehicle with a plurality of sunshade panels being able to open and close.

BACKGROUND ART

In a sunroof device provided with an opening section on a roof of a vehicle, a fixed panel or a movable panel constituted by a transparent glass plate is provided at the roof opening section. Further, a sunshade device as described in, for example, Patent Document 1 is used in order that the incident quantity of sunlight taken into a cabin through the panel can be adjusted.

The sunshade device described in Patent Document 1 is provided with guide rails slidably guiding a plurality of sunshade panels and dividing sections being pivotable about an axis at rear end sides of the guide rails and having first guide portions for guiding along first guide grooves sliders which are provided at a rear end portion of a rear side sunshade panel and second guide portions for guiding along second guide grooves sliders which are provided at a rear end portion of a front side sunshade panel. Further, the guide rails are provided with guide mechanisms which respectively guide sliders provided at respective front end portions of the rear side and front side sunshade panels, in a direction in which respective rear end portions of the sliders are guided. Then, in the state that the sunshade panels are closed, the plurality of sunshade panels are arranged in a flat state in the same plane. In the state that the sunshade panels are fully opened, the sliders provided at the respective rear end portions of the rear side and front side sunshade panels go up onto the first guide grooves and the second guide grooves while the sliders provided at the respective front end portions of the rear side and front side sunshade panels go up onto the guide mechanisms, so that a storing operation in storage sections is carried out as the respective sunshade panels are lifted up in turn.

PRIOR ART DOCUMENT

Patent Document
Patent Document 1: JP2008-213762 A

SUMMARY OF THE INVENTION

Problem to be Solved by the Invention

However, in the sunshade device shown in Patent Document 1, as described above, the sliders are stored in such a manner that the rear end portions of the respective sunshade panels are divided by the first guide portions and the second guide portions. Thus, because walls exist over and under each slider, a gap between the slider and each wall is restrained to suppress ricketiness. However, the guide mechanisms for storing the sliders on the front end portion side of each sunshade panel which sliders are larger than the sliders on the rear end portion side cannot be provided with dividers due to being unable to secure a sufficient space therein. Therefore, a problem arises in that ricketiness occurs during the traveling or the like of the vehicle because no wall or pressing member exists in the mid course that the sliders provided at the respective front end portions of the rear side and front side sunshade panels go up onto the guide mechanisms.

Therefore, the present invention has been made taking the foregoing problem in the prior art into consideration, and an object thereof is to provide a sunshade device for a vehicle which is highly reliably in that no ricketiness occurs even in the state that sunshade panels are in the mid course of storage.

Measures for Solving the Problem

In order to solve the aforementioned problem, the feature in construction of the invention resides in comprising guide rails adapted to be arranged on both sides of an opening section provided on a vehicle roof and having guide grooves extending in a front-rear direction, a plurality of sunshade panels having sliders being slidable along the guide grooves and arranged to be flat in a spread-out state but arranged to mutually overlap in parallel in a stored state, guide mechanisms for guiding the sliders of at least a rearmost sunshade panel of the sunshade panels upward or downward from the guide grooves in a transition from the spread-out state to the stored state, and an elastic member adapted to be provided on the vehicle roof for urging the rearmost sunshade panel to be pressed on a front side sunshade panel which is ahead of the rearmost sunshade panel when the sliders of the rearmost sunshade panel enter the guide mechanisms. A rib is provided at a front end portion of the rearmost sunshade panel, an upper surface of the rib has a rear upper surface located at a rear part thereof and a front upper surface located at a front part thereof, and the rear upper surface and the front upper surface differ in height for adjusting a load exerted from the elastic member.

FORM FOR PRACTICING THE INVENTION

Figure 1:
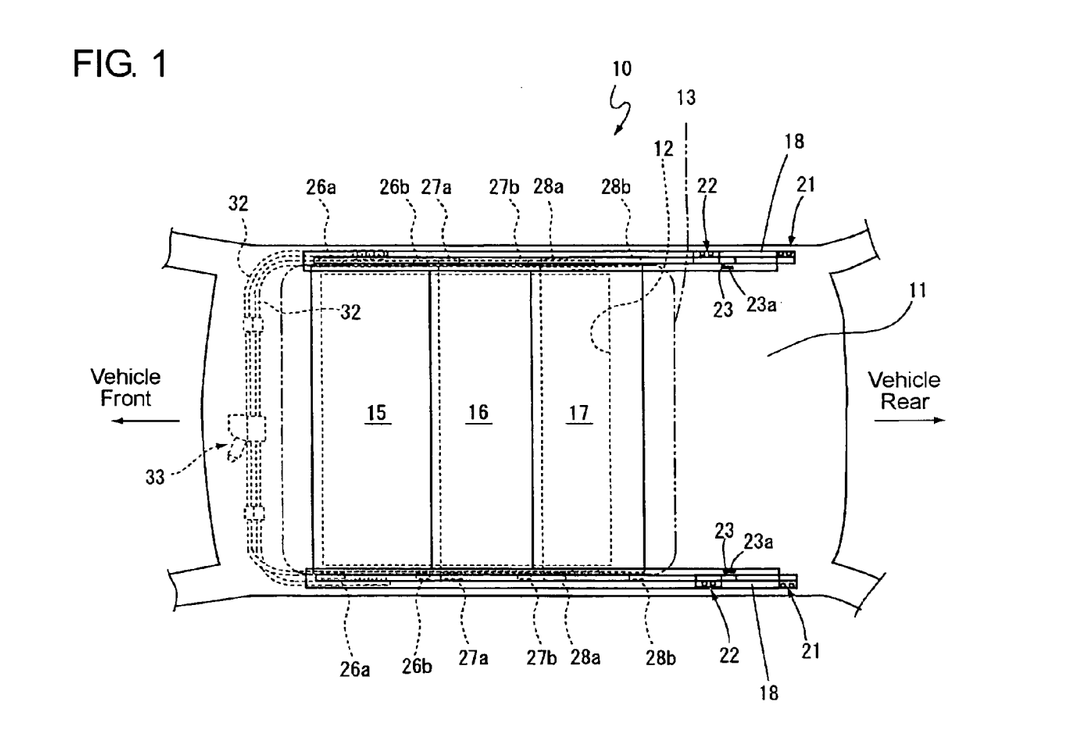
FIG. 1 is a plan view schematically showing a sunshade device for vehicle according to the present invention.

Hereafter, an embodiment according to the present invention will be described with reference to the drawings. FIG. 1 schematically shows the whole of a sunshade device 10. The sunshade device 10 is composed of guide rails 18 which are adapted and arranged on both sides of an opening section 12 provided on a vehicle roof 11, a plurality (three in the present embodiment) of sunshade panels 15, 16, 17 for shading adjustment which are arranged in a front-rear direction to be slidable along the guide rails 18, rear storage sections 21 provided on rear end sides of the guide rails 18 for storing rear end sliders 26a, 27b, 28b provided at rear end portions of the sunshade panels 15, 16, 17, and front storage sections 22 provided on the rear end sides of the guide rails 18 and ahead of the rear storage sections 21 for storing front end sliders 26a, 27a, 28a provided at front end portions of the sunshade panels 15, 16, 17. A panel 13 constituted by a transparent glass is attached at the opening section 12 over the sunshade panels 15, 16, 17, so that the sunlight passes through the panel 13 to be taken into a cabin.

In the following description, of the three sunshade panels 15, 16, 17, the sunshade panel arranged on the vehicle front side will be referred to as first sunshade panel 15, the sunshade panel arranged at the rearmost end on the vehicle rear side will be referred to as third sunshade panel 17, and the front side sunshade panel arranged ahead of the third sunshade panel 17 at the rearmost end will be referred to as second sunshade panel 16. Further, hereafter, "front-rear", "left-right" and "top-bottom" are as indicated in FIG. 2 and are in agreement with the directions on the vehicle.

Figure 6:
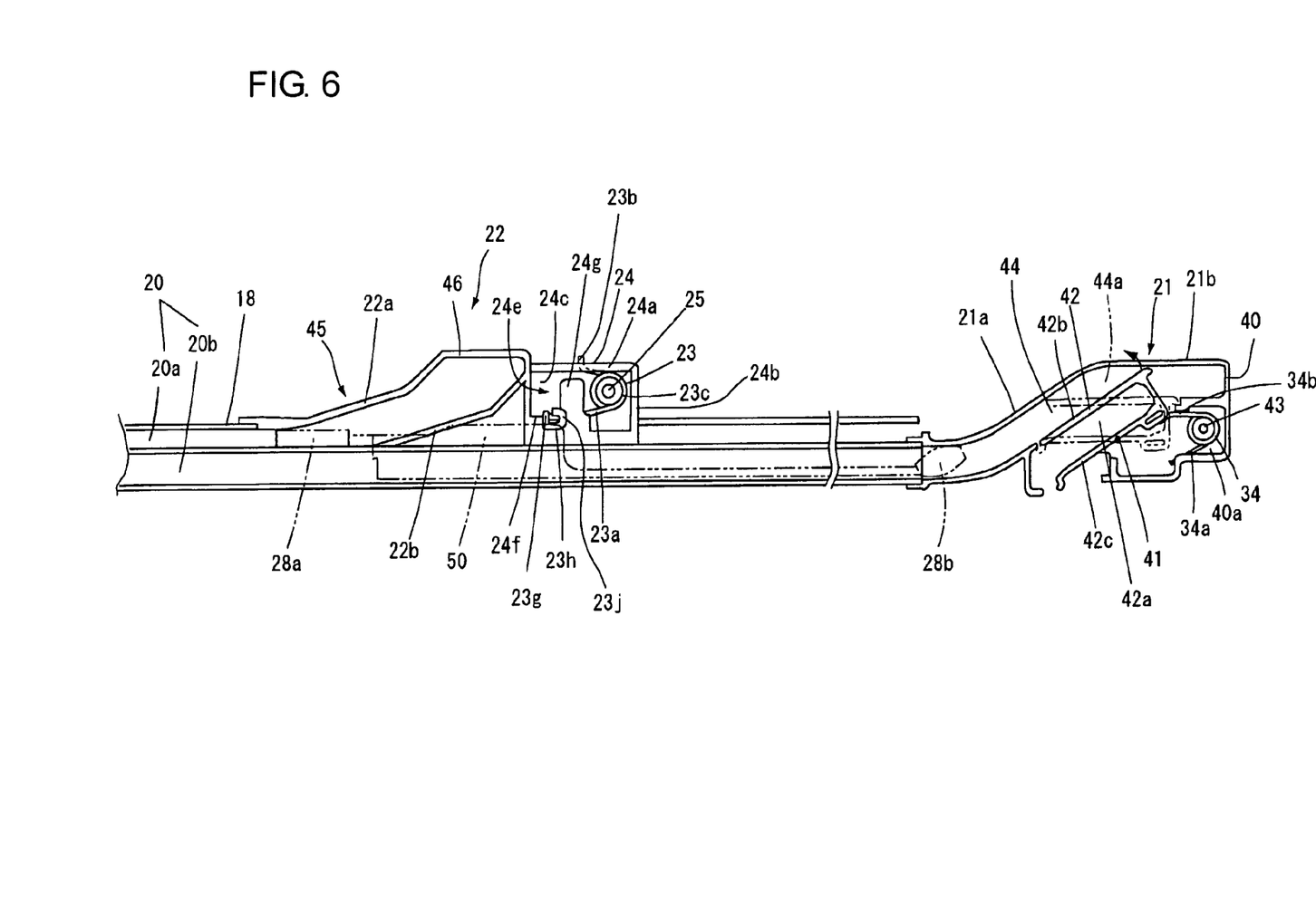
FIG. 6 is a side view of a guide rail and storage sections in the sunshade device for vehicle according to the present embodiment.

The guide rails 18 are provided as a pair on a cabin ceiling portion being on the inside of the roof 11 of the vehicle in correspondence to both side portions in the vehicle width direction of the opening section 12 to extend in parallel to the vehicle front-rear direction. At mutually facing surfaces of the pair of guide rails 18, as shown in FIGS. 2, 3 and 6, there open guide grooves 20 which extend in the vehicle front-rear direction. Each guide groove 20 comprises an upper groove 20a and a lower groove 20b vertically juxtaposed in parallel with each other and each taking an approximately U-shape in cross-section. As shown in FIG. 6, the rear storage section 21 being continuous with each lower groove 20b is formed at an end portion on the vehicle rear side of each lower groove 20b. On the other hand, the front storage section 22 being continuous with each upper groove 20a is formed at an end portion on the vehicle rear side of each upper groove 20a. The front storage sections 22 connected to the upper grooves 20a are arranged at a position which is spaced toward the vehicle front by a predetermined amount relative to the rear storage sections 21 connected to the lower grooves 20a, that is, by the interval between the front end sliders 27a, 28a and the rear end sliders 27b, 28b, referred to later, of the second and third sunshade panels 16, 17.

Figure 2:
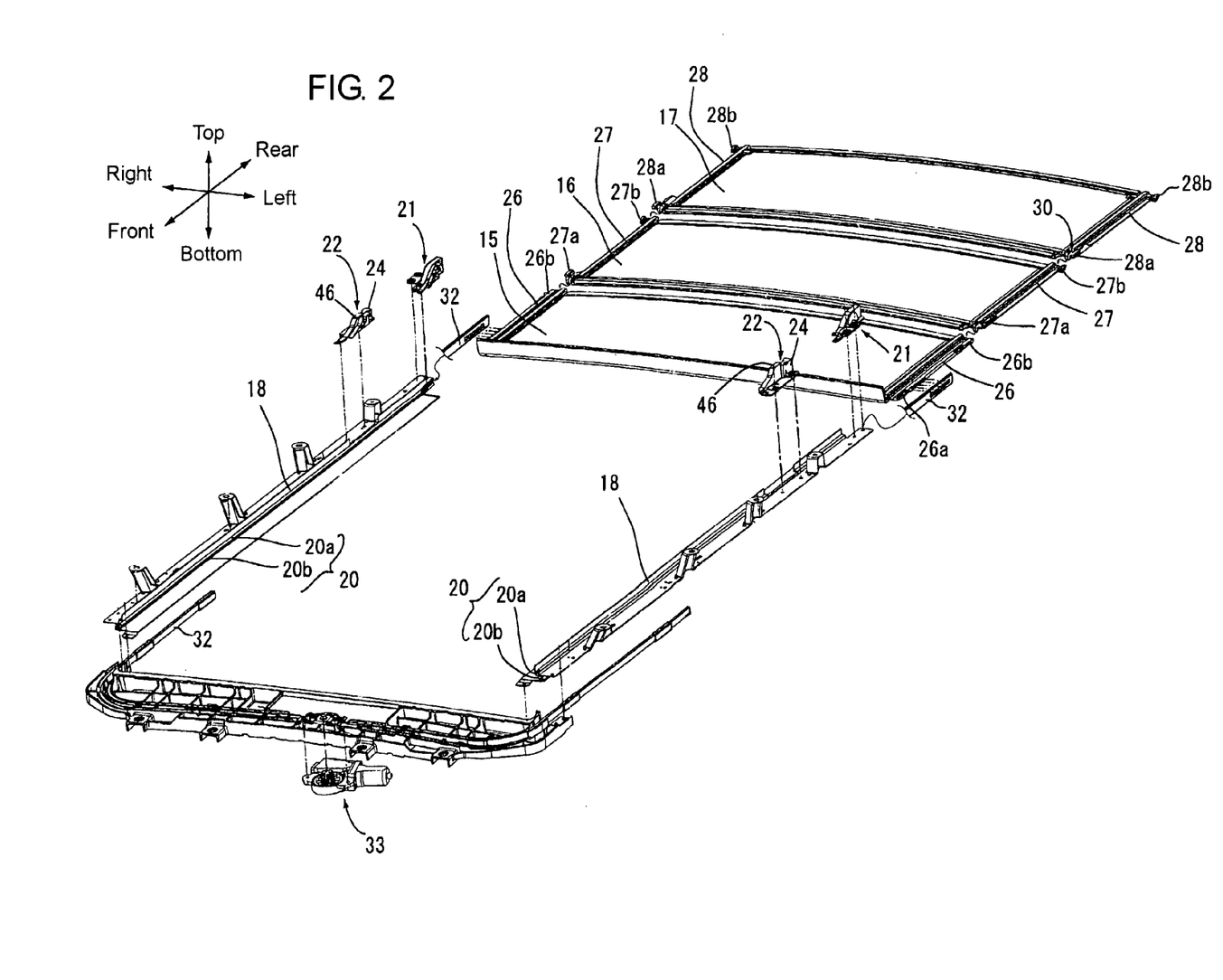
FIG. 2 is a perspective view of the sunshade device for vehicle according to the present invention.
Figure 3:
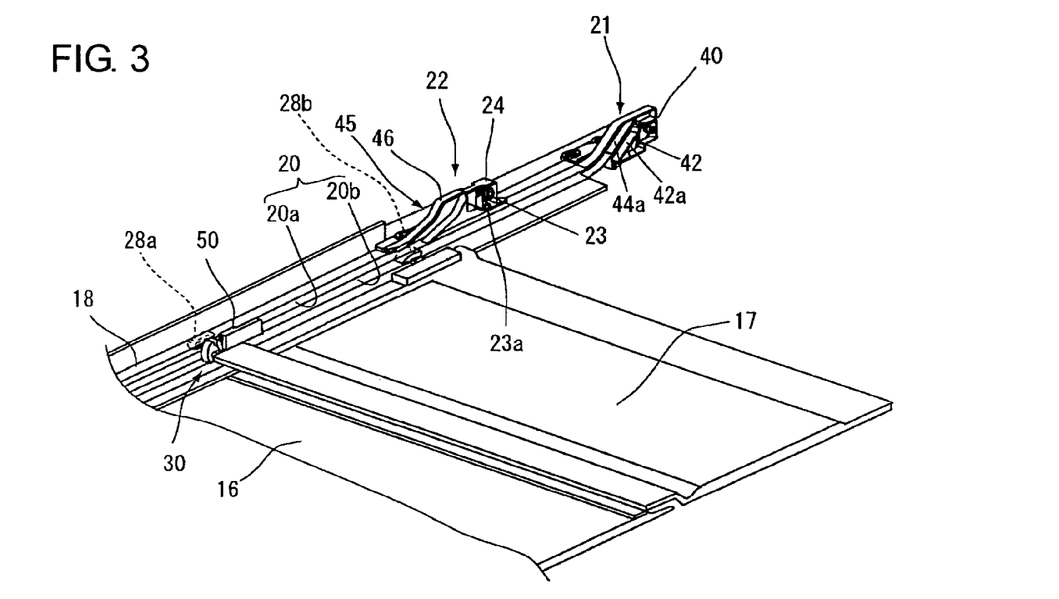
FIG. 3 is a view showing the state that the sunshade device for vehicle according to a present embodiment spreads out.

As shown in FIG. 2, the first, second and third sunshade panels 15, 16, 17 are respectively provided at both side portions in the left-right direction with sliders 26, 27, 28 extending in the front-rear direction. As shown in FIGS. 1 and 2, the sliders 26, 27, 28 are provided with front end sliders 26a, 27a, 28a at the front end portions thereof in the vehicle front-rear direction and rear end sliders 26b, 27b, 28b at the rear end portions thereof, respectively. Each of the sliders 26, 27, 28 is provided with a pair of protruding portions (not shown) which protrude toward the vehicle inside, and each of the sunshade panels 15, 16, 17 is pinched by the protruding portions, so that the sliders 26, 27, 28 and the sunshade panels 15, 16, 17 are united and bodily moved, respectively.

The rear end sliders 26b, 27b, 28b and the front end slider 26a are slidably guided along the lower grooves 20b of the guide rails 18. The rear end sliders 27b, 28b take the same shape and, as FIG. 7 typically shows the rear end slider 28b, are formed as a generally square shape with upper and lower surfaces thereof each of which is curved to draw a gentle arc shape toward outsides in the front-rear direction. Further, the rear end sliders 27b, 28b are able to be stored in the rear storage sections 21 when the sunshade panels are fully opened.

The front end sliders 27a, 28a are slidably guided along the upper grooves 20a of the guide rails 18. The front end sliders 27a, 28a take the same shape and, as FIG. 7 typically shows the rear end slider 28a, are formed as a generally square shape with upper and lower surfaces thereof each of which is curved to draw a gentle arc shape toward outsides in the front-rear direction. Then, when the first, second and third sunshade panels 15, 16, 17 are fully opened, the front end sliders 27a, 28a of the second and third sunshade panels 16, 17 are able to be stored in the front storage sections 22. Further, the front end slider 26a and the rear end slider 26b of the first sunshade panel 15 are formed as a generally squire shape with upper and lower surfaces thereof each of which is curved to draw a gentle arc shape toward the outsides in the front-rear direction, and are moved from a front part toward a rear part of the lower grooves 20b when the first, second and third sunshade panels 15, 16, 17 are fully opened.

Figure 7:
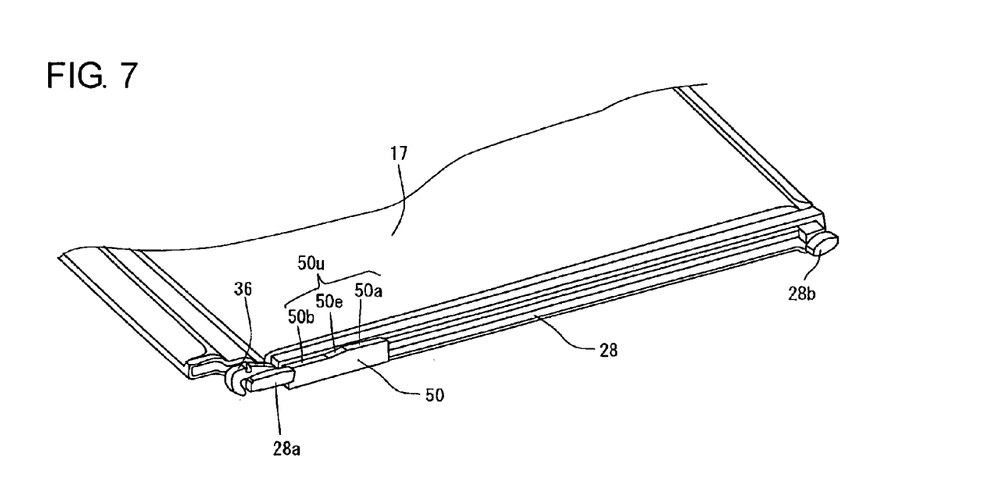
FIG. 7 is a perspective view of front end and rear end sliders and a rib on a third sunshade panel in the present embodiment.
Figure 8:
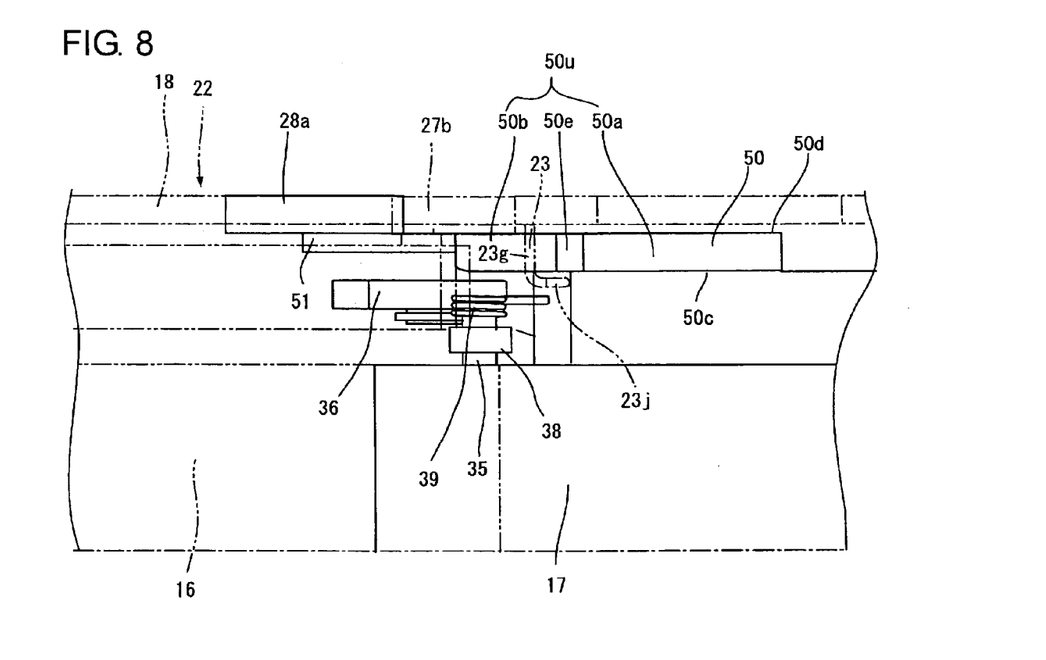
FIG. 8 is a top view of the front end slider portion of the third sunshade panel in the present embodiment (the two-dot-chain line corresponds to the state in FIG. 10(c)).
Figure 9:
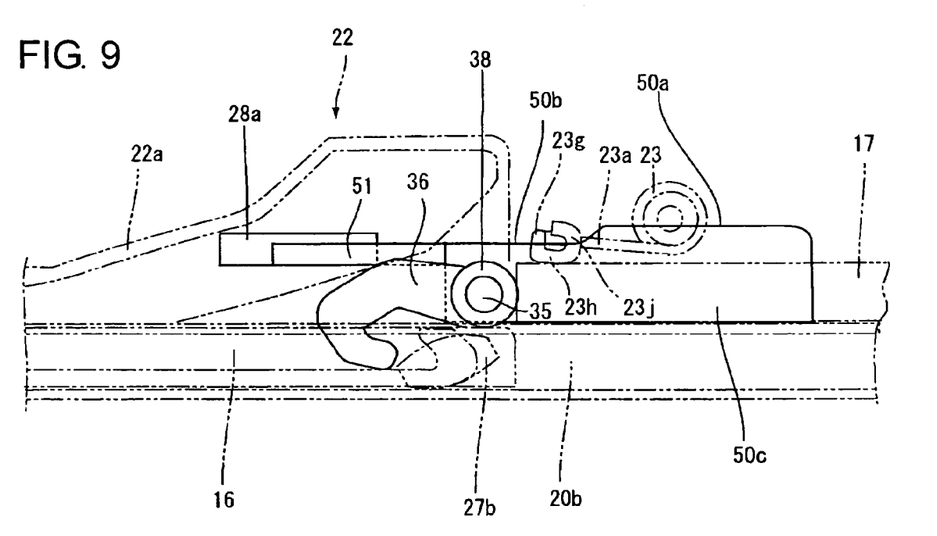
FIG. 9 is a side view of the front end slider of the third sunshade panel in the present embodiment (the two-dot-chain line corresponds to the state in FIG. 10(c)).

As shown in FIGS. 7, 8 and 9, at the side surfaces of the third sunshade panel 17, ribs 50 are respectively provided on inner sides behind the front end sliders 28a. Each rib 50 represents a generally cuboid shape with left and right surfaces 50c, 50d of the rib 50 formed in parallel in the vehicle front-rear direction, and is arranged at a predetermined position which is closer to the center side of the third sunshade panel 17 than the front end slider 28a. An upper surface portion 50u being the top surface of the rib 50 is formed to comprise a rear upper surface 50a located at a rear part thereof, a front upper surface 50b located at a front part thereof and formed to be somewhat lower than the rear upper surface 50a, and a slope surface 50e between the rear upper surface 50a and the front upper surface 50b. The upper surface portion 50u serves as a surface which comes to contact a contact portion 23g at one end portion 23a of a coil spring 23 being an elastic member, referred to later, as it moves in the front-rear direction and which is applied by the coil spring 23 with a downward load, and therefore, is formed at a predetermined height in order to make the load appropriate. The difference in height between the rear upper surface 50a and the front upper surface 50b of the upper surface portion 50u is for the purpose of adjusting the load imposed by the coil spring 23, and the stress of the coil spring 23 is reduced by setting somewhat lower the height of the front upper surface 50b on which a higher load is imposed. The front end slider 28a, the rib 50 and a connection portion 51 which connects the front end slider 28a and the rib 50 are bodily formed with a resin. Thus, the ribs 50 are bodily moved together with the front end sliders 28a upon movement of the third sunshade panel 17. The front end sliders 26a of the first sunshade panel 15 also act as drive sliders referred to later.

By coupling mechanisms 30 referred to later, connections are respectively made between the first and second sunshade panels 15, 16 and between the second and third sunshade panels 16, 17. In the closed state (spread-out state) of the first, second and third sunshade panels 15, 16, 17, as shown in FIG. 3, the sunshade panels 15, 16, 17 come to be arranged in juxtaposition to be flat with each other within a plane in which they extend. FIG. 3 is illustrated with the first sunshade panel 15 omitted therefrom. Further, in the fully opened state (stored state), the first, second and third sunshade panels 15, 16, 17 are arranged to put one panel on top of another in parallel relation.

Figure 4:
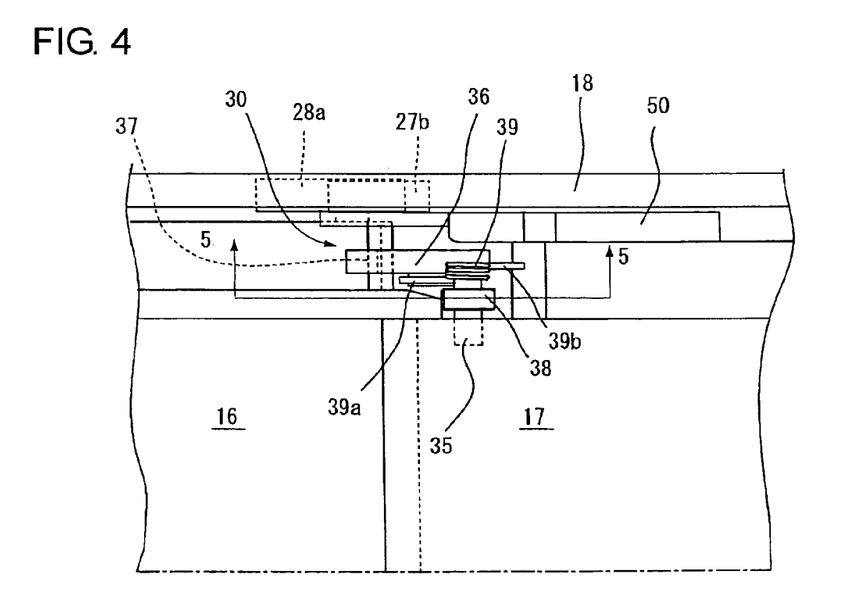
FIG. 4 is a view showing a coupling mechanism which couples a plurality of sunshade panels in the present embodiment.
Figure 5:
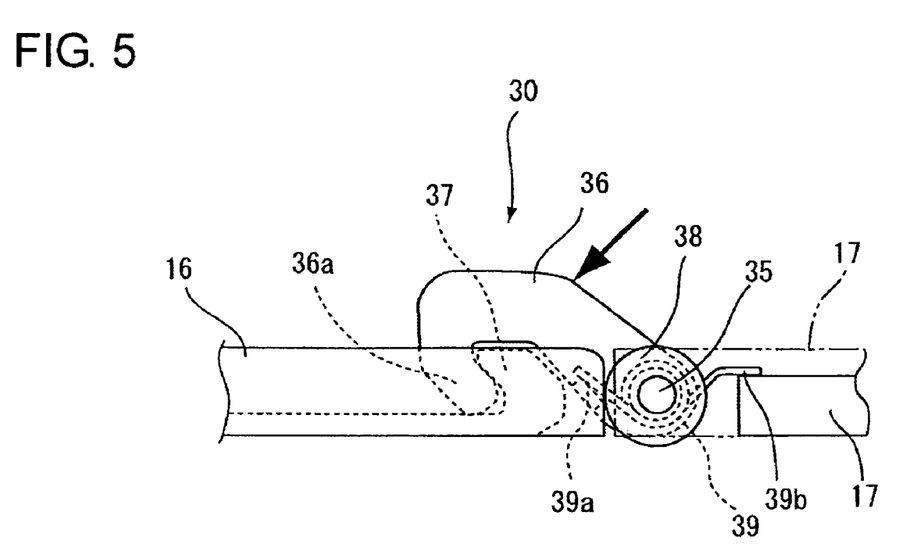
FIG. 5 is a sectional view taken along the line 5-5 in FIG. 4.

Next, with reference to FIGS. 4 and 5, description will be made regarding the specific construction of the coupling mechanisms 30 which are provided at each of respective spaces between the first, second and third sunshade panels 15, 16, 17. The coupling mechanisms 30 which couple the first and second sunshade panels 15, 16 and the coupling mechanisms 30 which couple the second and third sunshade panels 16, 17 take the same construction, and therefore, the following description will be made regarding the coupling mechanisms 30 which couple the second and third sunshade panels 16, 17.

Support shafts 35 are attached to the front end portion of the third sunshade panel 17, and link members 36 are provided on the support shafts 35 pivotably about a horizontal axis orthogonal to the vehicle front-rear direction. The link members 36 are formed with hook portions 36a which are releasably engageable with engaging portions 37 formed at the rear end portion of the second sunshade panel 16. The support shafts 36 rotatably support rubber rollers 38 facing the rear end surface of the second sunshade panel 16. Coil springs 39 which are formed and arranged with their centers on the support shafts 35 provide the link members 36 at all times with an urging force being counterclockwise (toward the direction of the arrow in FIG. 5) to bring the hook portions 36a into engagements with the engaging portions 37. One end 39b of each coil spring 39 is held engaged with a part of the third sunshade panel 17, while the other end 39a thereof is held engaged with an engaging portion formed at a part of the link member 36.

In the state that the hook portions 36a of the link members 36 are engaged with the engaging portions 37, the rear end surface of the second sunshade panel 16 is in contact with the rubber rollers 38, and hence, the relative movement between the second and third sunshade panels 16, 17 is restricted, so that the third sunshade panel 17 bodily follows the movement of the second sunshade panel 16. When the hook portions 36a of the link members 36 are released from the engaging portions 37, it becomes possible for the second sunshade panel 16 to move relative to the third sunshade panel 17.

The front end sliders (drive sliders) 26a provided on the first sunshade panel 15 are connected to a drive mechanism 33 through gear cables 32, as shown in FIG. 1. When a motor of the drive mechanism 33 is driven, the gear cables 32 are moved along the guide rails 18 in the vehicle front-rear direction in dependence on the driving direction. Thus, together with the front end sliders (drive sliders) 26a connected to the gear cables 32, the first sunshade panel 15 is moved along the guide rails 18. In this way, the first sunshade panel 15 is slidden by the driving power of the drive mechanism 33 relative to the roof 11 of the vehicle in the vehicle front-rear direction.

As shown in detail in FIG. 6, each rear storage section 21 is provided with a panel case 40 which has an inclined wall 21a being continuous with the lower groove 20b of the guide groove 20 and gradually lifting up toward the vehicle rear, and a horizontal wall 21b being continuous with an upper end of the inclined wall 21a and horizontally extending toward the vehicle rear. In the panel case 40, a dividing piece 42 being a dividing member is supported pivotably about a hinge pin 41 which is parallel in the width direction of the vehicle. The dividing piece 42 takes an approximately U-shape in section which has a guide groove 42a being almost the same in width as the lower groove 20b and opening at one end. Further, at a lower part in the panel case 40 and behind the dividing piece 42, there is provided a coil spring 34 which urges the dividing piece 42 counterclockwise (in the arrowed direction in FIG. 6) about the hinge pin 41. The coil spring 34 is arranged to take its axis on a support shaft 43 having a horizontal axis orthogonal to the vehicle front-rear direction. The support shaft 43 is secured to an inner side of a side wall 40a of the panel case 40 which wall is on the outside in the left-right direction. Then, one end 34a of the coil spring 34 is engaged with a part of the panel case 40, while the other end 34b thereof is engaged with a lower surface of the engaging piece 42. Thus, the dividing piece 42 is usually held in an angle state indicated by the solid line in FIG. 6 wherein one side 42b of the dividing piece 42 is in parallel to the inclined wall 21a to be spaced from the inclined wall 21a by the same dimension as the width dimension of the lower groove 20b.

In this state, an inclined guide way 44 is formed between the one side 42b of the dividing piece 42 and the inclined wall 21a, and the guide way 44 is connected to the lower groove 20b. Therefore, each rear end slider 28b of the third sunshade panel 17 sliding along the lower groove 20b is lifted up along the guide way 44. Then, when each rear end slider 28b is further moved rearward of the vehicle after being brought into contact with the horizontal wall 21b being at the upper end of the guide way 44, the dividing piece 42 is pivoted clockwise in FIG. 6 about the hinge pin 41, acting as a fulcrum, against the urging force of the coil spring 34 and is turned in orientation to a horizontal state shown by the two-dot-chain line in FIG. 6. As a consequence, a horizontal guide groove 44a is formed between the horizontal wall 21b of the rear storage section 21 and the dividing piece 42.

In the horizontal state indicated by the two-dot-chain line in FIG. 6, an arrangement is made wherein the one side 42b of the dividing piece 42 comes to continue with an intermediate portion of the inclined wall 21a, while the other side 42c of the dividing piece 42 comes to continue with a lower wall of the lower groove 20b. Thus, in the panel case 40 of the rear storage section 21, guide portions of two stages in the vertical direction are defined by being divided by the one side 42b of the dividing piece 42.

On the other hand, as shown in FIG. 6, each front storage section 22 comprises a panel case 46 for storing the front end sliders 27a, 28a of the second and third sunshade panels 16, 17, a coil spring 23 being an elastic member which is adapted to be located over the front end portion of the third sunshade panel 17 when the front end portion of the third sunshade panel 17 enters the front storage section 22, and a spring chamber 24 housing the coil spring 23. The coil spring 23 is for urging the third sunshade panel 17 downward through the rib 50 provided on each side surface of the front end portion of the third sunshade panel 17.

The panel case 46 has a guide mechanism 45, and the guide mechanism 45 comprises an inclined wall 22a being continuous with an upper wall of the upper groove 20a of the guide groove 20 and extending to lift up toward the vehicle rear, and an inclined wall 22b being continuous with the lower wall of the upper groove 20a of the guide groove 20 and extending to lift up toward the vehicle rear.

The spring chamber 24 is defined by an upper wall 24a arranged to continue with the rear of the panel case 46, a rear wall 24b being orthogonal to the vehicle front-rear direction, and a side wall 24c bent forward at right angles from an outside end of the rear wall 24b. A hook portion 24e is formed on the side facing the side wall 24c in the spring chamber 24. The hook portion 24e is a place with which one end portion 23a of the coil spring 23 is engaged, and comprises a horizontal portion 24f which is formed at a predetermined height determined as referred to later, and a tongue portion 24g being upright at a predetermined height for preventing the coil spring 23 from coming off.

The coil spring 23 is arranged with its axis on a support shaft 25 extending in the vehicle width direction, to be adapted to a predetermined load. The support shaft 25 is secured to be normal to the side wall 24c at an upper portion on the rear side of an inside surface of the side wall 24c of the spring chamber 24 which constitutes the front storage section 22. One end portion 23a of the coil spring 23 extends from a cylindrical body portion 23c of the coil spring 23 toward the vehicle front on a tangential line, and the one end portion 23a so extending is bent orthogonally toward the center side in the left-right direction (the vehicle width direction) of the third sunshade panel 17 at a position which goes slightly past a front end of the tongue portion 24g which is for preventing the coli spring 23 from coming off. After being so bent, the one end portion 23a then goes across the horizontal portion 24f of the hook portion 24e and, after forming a horizontal contact portion 23g which is to contact the upper surface 50u of the rib 50, extends slightly past an end surface 50c of the rib 50 to be bent downward. After being extended downward a predetermined amount, the one end portion 23a is bent orthogonally toward the vehicle rear and extends to secure a horizontal portion 23h a little amount. The one end portion 23a is then bent upward to form an arc portion on the rear side and thus, is provided with a bent portion 23j which is formed to face the end surface 50c of the rib 50 with a slight clearance. The coil spring 23 so formed is engaged in contact with the upper surface of the horizontal portion 24f of the hook portion 24e at a lower end of the contact portion 23g of the one end portion 23a. Further, the other end portion 23b of the coil spring 23 is engaged with a hole portion provided on the upper wall 24a of the spring chamber 24.

In this way, the lower end height of the contact portion 23g of the coil spring 23 is determined in dependence on the upper surface height of the horizontal portion 24f. Further, it is most desirable that the lower end height of the contact portion 23g of the coil spring 23 is such that at the time point when the front end slider 28a of the third sunshade panel 17 begins to be guided upward by the guide mechanism 45 (in the state of FIG. 10(b) referred to later), the rear upper surface 50a of the rib 50 provided on the front end slider 28a of the third sunshade panel 17 arranged at the rearmost end contacts the lower end of the contact portion 23g of the coil spring 23 to begin to urge the third sunshade panel 17 downward. Therefore, the upper surface height of the horizontal portion 24f of the hook portion 24e is determined to bring about such a state. It is to be noted that the time point when the guiding upward begins is not only a strict point but also one having a certain range in advance and afterward.

Next, description will be made regarding the open/close operation of the first, second and third sunshade panels 15, 16, 17 in the embodiment described above. As apparent from FIGS. 1 and 2, the left and right guide constructions each comprising the guide rail 18 and the parts associated therewith are symmetrical in the left-right direction of the vehicle, and therefore, the following operation will be described only regarding the right guide construction shown on the top side in FIG. 1 for the sake of brevity. FIGS. 1 and 3 show the first, second and third sunshade panels 15, 16, 17 in a spread-out state, wherein the front end slider 26a of the sunshade panel 15 is engaged with the lower groove 20b of the guide rail 18, while the front end sliders 27a, 28a of the sunshade panels 16, 17 are engaged with the upper groove 20a of the guide rail 18. Further, the rear end sliders 26b, 27b, 28b are engaged with the lower groove 20b. Thus, the first, second and third sunshade panels 15, 16, 17 are arranged in a flat state to be juxtaposed in the vehicle front-rear direction. Further, FIGS. 10(a) to 10(d) schematically show the process for the first, second and third sunshade panels 15, 16, 17 to move from the spread-out state to the fully opened state.

Figure 10A:
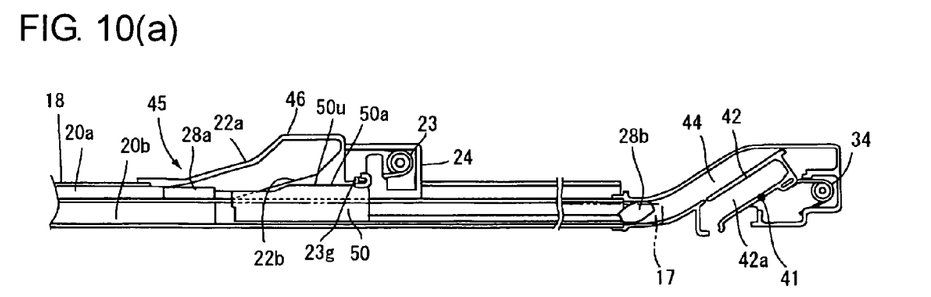
FIGS. 10(a)-10(d) are views showing operation states of the sunshade panel in the present embodiment.

First of all, in the spread-out state shown in FIGS. 1 and 3 of the first, second and third sunshade panels 15, 16, 17, when the motor of the drive mechanism 33 is driven by the manipulation of a sunshade panel opening switch which is arranged on an instrument panel or in the vicinity thereof, the drive power generated by the motor is transmitted to the first sunshade panel 15 through the front end slider (drive slider) 26a, and the first sunshade panel 15 is slidden toward the vehicle rear along the guide groove 20 of the guide rail 18. At this time, by being given the drive power from the first sunshade panel 15 through the coupling mechanisms 30, the second and third sunshade panels 16, 17 are also slidden in the same direction along the guide groove 20 of the guide rail 18. Thus, in the beginning, the front end slider 28a and the rear end slider 28b of the third sunshade panel 17 respectively enter the front storage section 22 and the rear storage section 21 which are provided on the rear side of the guide rail 18. At this time, the upward movements of the front end slider 28a and the rear end slider 28b have not begun yet, and thus, as shown in FIG. 10(a), no large gap exists between the upper groove 20a of the guide groove 20 and the front end slider 28a and between the lower groove 20b and the rear end slider 28b, so that the ricketiness is suppressed.

Figure 10B:
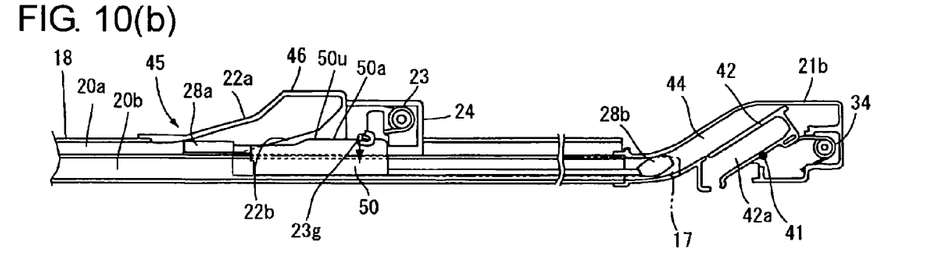

Then, when the first sunshade panel 15 is further slidden rearward, the front end slider 28a of the third sunshade panel 17 begins to be lifted up by being guided by the guide mechanism 45 which is constituted by the inclined walls 22a, 22b of the front storage section 22 and is brought into the state shown in FIG. 10(b). Since the construction is such that the rear upper surface 50a of the rib 50 provided on the front end slider 28a and the lower end of the contact portion 23g of the coil spring 23 provided in the front storage section 22 come to contact each other at this time, they come to contact each other, and thus, the third sunshade panel 17 begins to be urged by the spring force of the coil spring 23 downward as indicated by the arrow, so that the occurrence of ricketiness can be suppressed. Further, at this time, the rear end slider 28b also enters the rear storage section 21 and begins to be lifted up along the guide way 44.

Figure 10C:
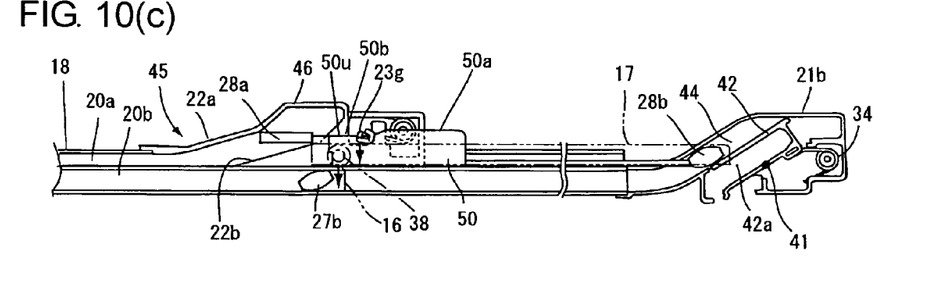

Subsequently, when the first sunshade panel 15 is further slidden rearward, the third sunshade panel 17 is further lifted upward relative to the second sunshade panel 16 as it is held in about a horizontal state and is brought into the state being in the mid course of an upward movement as shown in FIG. 10(c), and the rubber roller 38 of the third sunshade panel 17 goes up onto the upper surface of the second sunshade panel 16. Then, the front upper surface 50b of the rib 50 provided on the front end slider 28a of the third sunshade panel 17 comes to contact the lower end of the contact portion 23g of the coil spring 23 provided at the rear part of the front storage section 22, so that the third sunshade panel 17 is urged downward. Thus, the load urged downward on the front upper surface 50b of the rib 50 provided at the front end portion of the third sunshade panel 17 presses the second sunshade panel 16 in the arrowed direction in the figure through the rubber roller 38, so that the occurrence of ricketiness can be suppressed. At this time, the lower end of the contact portion 23g and the front upper surface 50b on the lower side of the rib 50 are brought into contact. This is because the torsion angle of the coil spring 23 increases with an increase in stress as the third sunshade panel 17 is lifted up, and is for the purpose of lowering the stress generated on the coil spring 23 to enhance the reliability of the coil spring 23 by moving the upper surface in contact of the rib 50 from the rear upper surface 50a to the front upper surface 50b while the third sunshade panel 17 is lifted up beyond the predetermined amount.

Then, when the first sunshade panel 15 is further slidden rearward, the rear end slider 27b of the second sunshade panel 16 enters the rear storage section 21. The rear end slider 27b advancing into the rear storage section 21 is guided upward and advances into the guide groove 42a of the dividing piece 42 (refer to FIG. 6) which has already been pivoted and held in a horizontal state by the advancement of the rear end slider 28b of the third sunshade panel 17 into the guide way 44.

Thus, the rear end slider 28b of the third sunshade panel 17 advances into the space between the horizontal wall 21b of the panel case 40 and the one side 42b of the dividing piece 42 to be restrained against movement in the vertical direction, while the rear end slider 27b of the second sunshade panel 16 advances into the guide groove 42a of the dividing piece 42 to be restrained against movement in the vertical direction, so that the ricketiness thereof can be suppressed.

Figure 10D:
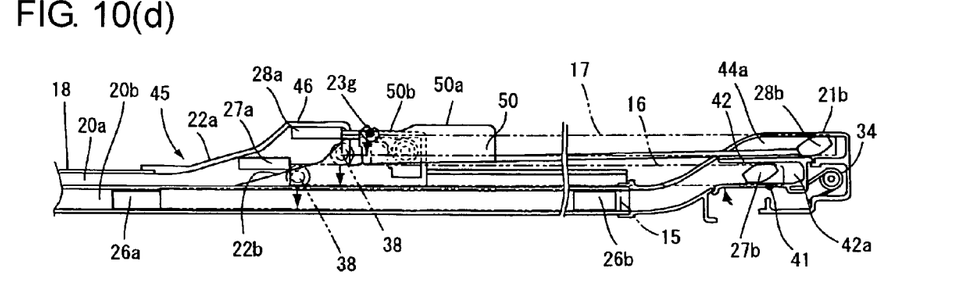

At the same time, the front end slider 27a of the second sunshade panel 16 is lifted up by the guide mechanism 45 of the front storage section 22. Then, by the same action as the second and third sunshade panels 16, 17 do as mentioned above, the rubber roller 38 provided on the second sunshade panel 16 goes up onto the upper surface of the first sunshade panel 15, whereby a complete storage state is brought about as shown in FIG. 10(d). Thus, the load which is urged by the coil spring 23 on the front upper surface 50b of the rib provided on the front end portion of the third sunshade panel 17 presses the second sunshade panel 16 and the first sunshade panel 15 in the respective directions indicated by the arrows through the rubber rollers 38, 38, so that the ricketiness thereof can be suppressed.

As is clear from the foregoing description, in the present embodiment, the rib 50 is provided on the front end slider 28a at the front end portion of the third sunshade panel 17 being at the rearmost end, and from the time point when the front end slider 28a begins to be guided upward along the guide mechanism 45, the upper surface portion 50u of the rib 50 and the lower end of the contact portion 23g of the one end portion 23a of the coil spring 23 being an elastic member are brought into contact to begin the pressing downward. Therefore, while being moved in the front-rear direction, the third sunshade panel 17 can be moved smoothly without suffering an excess sliding resistance exerted thereon and is urged downward from the time point when it is begun to be guided upward by the guide mechanism 45, so that the ricketiness can be suppressed, resulting in enhancement in reliability. Further, since the contact surface with the coil spring 23 is formed by the rib 50, it is possible to simplify the construction and to attain the design reduced in cost. Further, since the coil spring 23 is used as the elastic member, it is possible to secure a sufficient pressing load easily, to increase the freedom in design and to attain the design reduced in cost.

Further, in the present embodiment, the respective rear end sliders 28b, 27b of the third sunshade panel 17 at the rearmost end and the second sunshade panel 16 ahead thereof are guided by the upper guide groove 44a and the lower guide groove 42a of the dividing piece 42 being a dividing member, and the respective front end sliders 28a, 27a are guided by the guide mechanism in the same direction as the rear end sliders 28b, 27b. Therefore, at the rear end portions of the third and second sunshade panels 17, 16, the guide groove 44a and the guide groove 42a strict the rear end sliders 28b, 27b from generating ricketiness. Further, at the front end portion of the third sunshade panel 17, the front end portion is continued to be pressed by the coil spring 23 downward as it is guided upward. Therefore, the load exerted downward by the third sunshade panel 17 presses the second sunshade panel 16 through the rubber roller 38 which is provided on the third sunshade panel 17 and which has gone up onto the second sunshade panel 16. Further, the first sunshade panel 15 is pressed through the rubber roller 38 which is provided on the second sunshade panel 16 and which has gone up onto the first sunshade panel 15. In this way, the ricketiness of the first, second and third sunshade panels 15, 16, 17 is further suppressed.

Further, in the present embodiment, the lower end of the contact portion 23g at the one end portion 23a of the coil spring 23 contacts the upper surface of the rib 50 having the rear upper surface 50a and the front upper surface 50b which are different in height, to urge the third sunshade panel 17 downward. Thus, when the rib 50 at the front end portion of the sunshade panel 17 being at the rearmost end moves upward, the torsion angle of the coil spring 23 becomes large as a consequence, to increase the urging force acting on the rib 50 at the front end portion of the third sunshade panel 17. Then, when the third sunshade panel 17 further moves rearward and obliquely upward, the contact at the one end portion 23a of the coil spring 23 moves from the rear upper surface 50a to the front upper surface 50b which is lower than the rear upper surface 50a, to decrease the torsion angle of the coil spring 23, so that it can be realized to reduce the stress of the coil spring 23.

Further, in the present embodiment, since the coil spring 23 has the contact portion which directly contacts the third sunshade panel 17 being at the rearmost end, it is possible to further simplify the vehicle sunshade device in construction.

Still in the present embodiment, the front storage section 22 and the rear storage section 21 are continuous with the guide groove 20 to extend obliquely upward, so that the second and third sunshade panels 16, 17 are guided upward. Then, by the coil spring 23 being an elastic member which is secured over the third sunshade panel 17, the third sunshade panel 17 is urged downward through the rib 50 secured to the third sunshade panel 17 to suppress the ricketiness. However, without being limited to this, there may be taken another construction that the front storage section 22 and the rear storage section 21 are made to extend obliquely downward continually from the guide groove 20 so that the third and the second sunshade panels 17, 16 are successively guided obliquely downward. In this case, however, the coil spring 23 may be secured under the third sunshade panel 17, and the third sunshade panel 17 may be urged upward by the coil spring 23 to suppress the ricketiness.

Further, although in the present embodiment, the sunshade device is constructed by the three sunshade panels 15, 16, 17, it may be constructed by two sunshade panels including a front side sunshade panel and a rear side sunshade panel being at the rearmost end. In this case, however, since the front side sunshade panel is not moved upward or downward, the rear storage section 21 does not need to be provided with the two-stage guide grooves constituted by the dividing piece 42. This also results in attaining the same effects as mentioned above.

Further, although in the present embodiment, the elastic member is constituted by the coil spring 23, it may, without being limited to this, use a leaf spring or the like, for example.

Furthermore, although in the present embodiment, the upper surface portion 50u of the rib 50 and the one end portion 23a of the coil spring 23 being an elastic member are made to contact directly, the same effects can be attained by, without being limited to this, interposing a separate member between the upper surface portion 50u and the one end portion 23a.

Various features and many of the attendant advantages in the foregoing embodiment will be summarized as follows:

In the vehicle sunshade device according to the foregoing embodiment typically shown in FIGS. 6-9, when the sliders 28a of the rearmost sunshade panel 17 enter the guide mechanisms 45, the rearmost sunshade panel 17 is urged by the elastic member 23 provided on the vehicle roof 11 to be pressed on the front side sunshade panel 16. Thus, when the sliders 28a of the rearmost sunshade panel 17 move along the guide mechanisms 45, the pressing on the front side sunshade panel 16 is held, so that the ricketiness is suppressed. Further, even where the front side sunshade panel 16 is constructed also to move along the guide mechanisms 45, the front side sunshade panel 16 which comes to be located under or over the rearmost sunshade panel 17 is pressed downward or upward through the rearmost sunshade panel 17, so that the ricketiness is suppressed.

In addition, the rear upper surface 50a and the front upper surface 50b are provided on the upper surface 50u of the rib 50 which the elastic member 23 presses in contact, and in dependence on the situation, the contact portion 23g moves on the rear upper surface 50a or the front upper surface 50b with the result that the urging force on the rearmost sunshade panel 17 can be altered. Thus, when the front end portion of the rearmost sunshade panel 17 moves upward along the guide mechanisms 45 to make the urging force of the elastic member 23 sufficiently large, the contact portion 23g of the elastic member 23 moves from the higher one to the lower one of the rear upper surface 50a and the front upper surface 50b to weaken the urging force of the elastic member 23, so that it is possible to reduce the stress of the elastic member 23.

In the vehicle sunshade device according to the foregoing embodiment typically shown in FIGS. 1, 3 and 6, the respective rear end sliders 28b, 27b of the rearmost sunshade panel 17 and the front side sunshade panel 16 are guided along the upper guide grooves 44a and the lower guide grooves 42a of the dividing members 42, while the respective front end sliders 28a, 27a are guided by the guide mechanisms 45 in the same direction as the rear end sliders 28b, 27b are guided. Thus, the respective rear end sliders 28b, 27b are inhibited by the upper guide grooves 44a and the lower guide grooves 42a of the dividing members 42 from becoming unstable in the vertical direction, so that the ricketiness is further suppressed.

In the vehicle sunshade device according to the foregoing embodiment typically shown in FIGS. 1, 3 and 6, the upper surface 50u of the rib 50 and the elastic member 23 come to contact to begin the urging downward at the time point when the front end portion of the rearmost sunshade panel 17 beings to be guided upward by the guide mechanisms 45. Thus, the sunshade panels 16, 17 do not have an excess sliding resistance exerted thereon and can move smoothly without rattling when moved in the front-rear direction, but are urged to be pressed downward at the time point when beginning to be guided upward by the guide mechanisms 45, so that the occurrence of ricketiness is suppressed. Further, since the rib 50 forms the contact surface 50u with the elastic member 23, it is possible to simplify the construction and to take the measures at a low cost.

In the vehicle sunshade device according to the foregoing embodiment typically shown in FIGS. 6 and 9, the coil spring 23 is used as the elastic member. Thus, it is possible to secure a sufficient pressing load easily, to increase the freedom in design and to take the measures at a low cost.

In the vehicle sunshade device according to the foregoing embodiment typically shown in FIGS. 6 and 9, since the coil spring 23 has the contact portion 23g which directly contacts the rearmost sunshade panel 17, it is possible to further simplify the vehicle sunshade device in construction.

Industrial Applicability

A sunshade device according to the present invention is suitable for vehicles such as passenger car, bus, truck and the like because of capable of effectively suppressing the ricketiness of sunshade panels in the state that the same are stopped in a predetermined position with an opening section left open during the travelling of the vehicle.

The invention claimed is:

1. A vehicle sunshade device comprising:
   guide rails adapted to be arranged on both sides of an opening section provided on a vehicle roof and having guide grooves extending in a front-rear direction;
   a plurality of sunshade panels having sliders being slidable along the guide grooves and arranged to be flat in a spread-out state but arranged to mutually overlap in parallel in a stored state;
   guide mechanisms for guiding the sliders of at least a rearmost sunshade panel of the sunshade panels upward or downward from the guide grooves in a transition from the spread-out state to the stored state; and
   an elastic member adapted to be provided on the vehicle roof for urging the rearmost sunshade panel to be pressed on a front side sunshade panel which is ahead of the rearmost sunshade panel when the sliders of the rearmost sunshade panel enter the guide mechanisms;
   wherein:
   a rib is provided at a front end portion of the rearmost sunshade panel;
   an upper surface of the rib has a rear upper surface located at a rear part thereof and a front upper surface located at a front part thereof; and
   the rear upper surface and the front upper surface differ in height for adjusting a load exerted from the elastic member.

2. The vehicle sunshade device as set forth in claim 1, wherein the sliders comprise front end sliders and rear end sliders which are provided at a front end portion and a rear end portion of each sunshade panel, the device further comprising:
   dividing members being pivotable about an axis on rear end sides of the guide rails and having guide portions for guiding the rear end sliders of the rearmost sunshade panel along upper grooves and guide portions for guiding the rear end sliders of the front side sunshade panel along lower grooves; and
   the guide mechanisms for guiding the respective front end sliders of the rearmost sunshade panel and the front side sunshade panel in a direction in which the respective rear end sliders are guided;
   wherein when entering the guide mechanisms, a roller of the rearmost sunshade panel presses the front side sunshade panel downward.

3. The vehicle sunshade device as set forth in claim 2, wherein:
   the upper surface of the rib and the elastic member come to contact to begin the pressing downward at a time point when the front end portion of the rearmost sunshade panel begins to be guided upward by the guide mechanisms.

4. The vehicle sunshade device as set forth in claim 1, wherein the elastic member is a coil spring.

5. The vehicle sunshade device as set forth in claim 4, wherein the coil spring comprises:
   a cylindrical body portion arranged with its axis extending in a vehicle width direction;
   one end portion extending from the cylindrical body portion forward on a tangential line; and
   a contact portion extending from the one end portion in the vehicle width direction for contacting the rearmost sunshade panel.

* * * * *